(12) United States Patent
Takahashi et al.

(10) Patent No.: US 11,036,058 B2
(45) Date of Patent: Jun. 15, 2021

(54) DRIVING CONTROL APPARATUS, DEVICE, OPTICAL MODULE AND DRIVING CONTROL METHOD

(71) Applicant: Asahi Kasei Microdevices Corporation, Tokyo (JP)

(72) Inventors: Arata Takahashi, Tokyo (JP); Seiichi Nakano, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 417 days.

(21) Appl. No.: 15/952,248

(22) Filed: Apr. 13, 2018

(65) Prior Publication Data

US 2018/0299689 A1 Oct. 18, 2018

(30) Foreign Application Priority Data

Apr. 13, 2017 (JP) .............................. JP2017-079610

(51) Int. Cl.

| | |
|---|---|
| *G02B 27/64* | (2006.01) |
| *G01H 11/02* | (2006.01) |
| *G02B 7/04* | (2021.01) |
| *G01H 3/10* | (2006.01) |
| *G01H 3/04* | (2006.01) |

(Continued)

(52) U.S. Cl.
CPC .............. *G02B 27/64* (2013.01); *G01H 3/04* (2013.01); *G01H 3/10* (2013.01); *G01H 11/02* (2013.01); *G02B 7/04* (2013.01); *G02B 27/04* (2013.01); *G02B 27/09* (2013.01); *G02B 27/646* (2013.01)

(58) Field of Classification Search
CPC .... G02B 21/365; G02B 21/06; G02B 21/361; G02B 21/16; G02B 27/646; G02B 15/173; G02B 15/14; G02B 15/177; G02B 15/16; G02B 7/08; G03B 2205/0015; G03B 2205/0069; G03B 2205/0023; G03B 2205/0007; G03B 17/14; G03B 17/02; G03B 17/04; G03B 5/00; G03B 3/10; G03B 13/36; H04N 5/2253; H04N 5/2254; H04N 5/2257

See application file for complete search history.

(56) References Cited

U.S. PATENT DOCUMENTS

| | | |
|---|---|---|
| 2006/0153554 A1 | 7/2006 | Misawa et al. |
| 2010/0052593 A1 | 3/2010 | Kishimoto et al. |

(Continued)

FOREIGN PATENT DOCUMENTS

| | | |
|---|---|---|
| JP | H07-93002 A | 4/1995 |
| JP | 2010-119155 A | 5/2010 |

(Continued)

*Primary Examiner* — Darryl J Collins
*Assistant Examiner* — Tamara Y. Washington

(57) ABSTRACT

A driving control apparatus, a device, an optical module, and a driving control method will be provided, the driving control apparatus including: an acquiring unit to acquire a detection signal depending on a detection result of sensing a position of a driving target object; a driving control unit to generate a driving signal to move the driving target object to a target position based on the detection signal; an oscillation detecting unit to detect oscillation in a signal at a predetermined object point on a signal path from the detection signal to the driving signal; and an oscillation suppressing unit to suppress oscillation of the signal path according to detection of the oscillation.

15 Claims, 7 Drawing Sheets

(51) Int. Cl.
  *G02B 27/09*   (2006.01)
  *G02B 27/04*   (2006.01)

(56) References Cited

U.S. PATENT DOCUMENTS

| | | |
|---|---|---|
| 2012/0007540 A1 | 1/2012 | Tanabe et al. |
| 2014/0292249 A1 | 10/2014 | Lyden et al. |
| 2015/0015729 A1 | 1/2015 | Kasamatsu |

FOREIGN PATENT DOCUMENTS

| | | | |
|---|---|---|---|
| JP | 2013-126266 A | 6/2013 | |
| JP | 2015-085278 A | 5/2015 | |
| WO | WO-2015056470 A1 * | 4/2015 | ........... G11B 7/0946 |

* cited by examiner

DRIVING CONTROL APPARATUS, DEVICE, OPTICAL MODULE AND DRIVING CONTROL METHOD

The contents of the following Japanese patent application are incorporated herein by reference:

NO. 2017-079610 filed in JP on Apr. 13, 2017.

BACKGROUND

1. Technical Field

The present invention relates to a driving control apparatus, a device, an optical module and a driving control method.

2. Related Art

Conventionally, an optical module having lenses installed to digital cameras, cell phones, small PCs etc. performs an auto-focus function and a vibration reduction function etc. by moving and controlling the position of the lens by an actuator and the like. (See the Patent Document 1, for example.)

Patent Document 1: WO2013/183270.

The actuator to move the position of the lens has been driven according to a driving signal generated by PID control circuits etc., for example. However, characteristics of the actuator may change suddenly or unexpectedly due to wear of mechanical unit, assembly failures, partial destruction, partially falling, manufacturing defects of components, and aging etc. In such case, it becomes hard to secure stable operation of the actuator even using the PID control circuit, resulting in that the system may oscillate or stop.

SUMMARY

A first aspect of the present invention will provide a driving control apparatus and a driving control method, the driving control apparatus including: an acquiring unit to acquire a detection signal depending on a position of a lens of an optical module; a driving control unit to generate a driving signal to move the lens to a target position in a focus control or a vibration reduction control based on the detection signal; an oscillation detecting unit to detect oscillation in a signal at a predetermined object point on a signal path from the detection signal to the driving signal; and an oscillation suppressing unit to suppress oscillation in a signal at a predetermined object point on the signal path according to detection of the oscillation.

A second aspect of the present invention will provide a device including: a sensor to detect the position of the lens; and the driving control apparatus of the first aspect. A third aspect of the present invention will provide an optical module including: the device of the second aspect; the lens; and a driving device to drive the lens according to the driving signal from the driving control apparatus.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
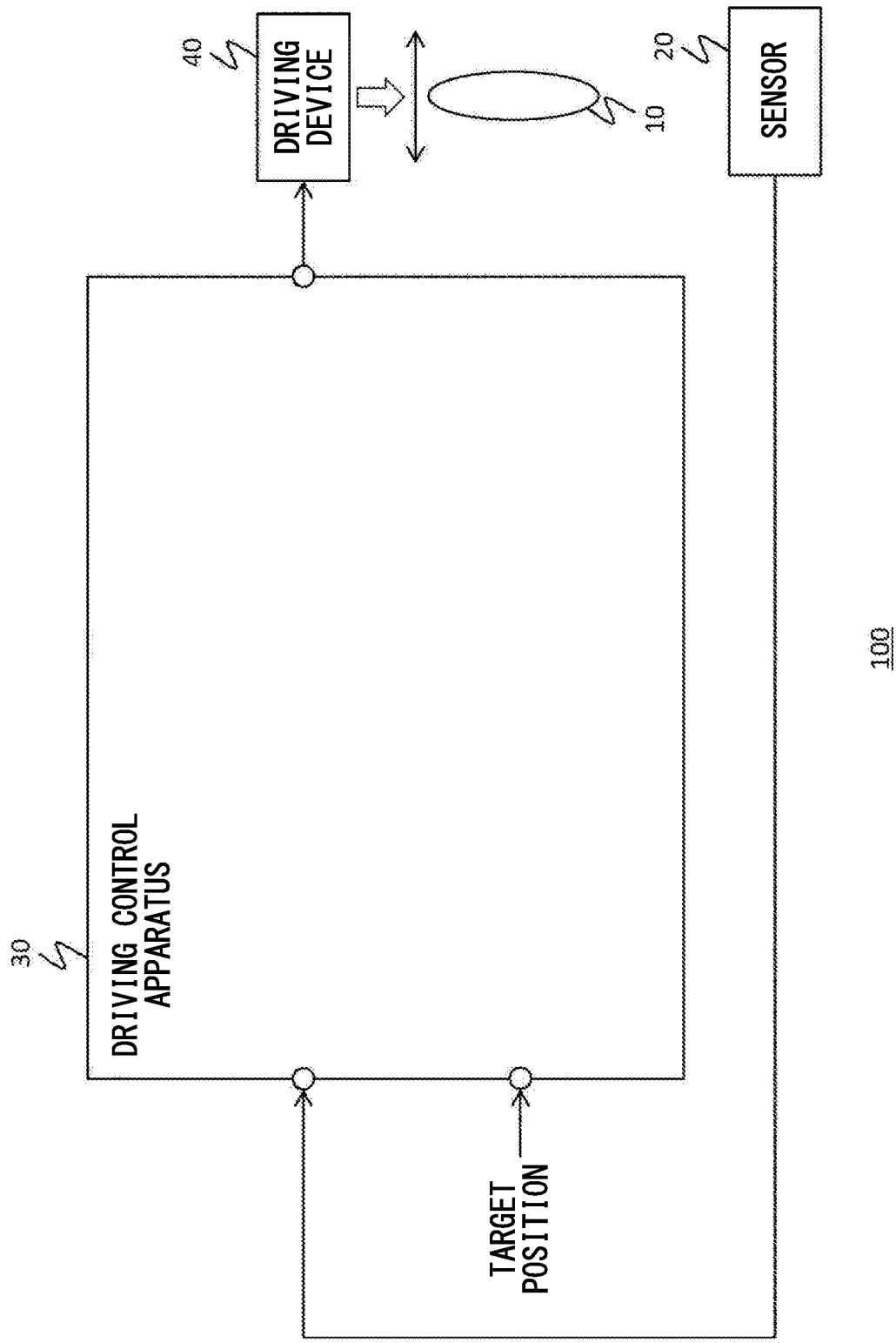
FIG. 1 shows an exemplary configuration of a driving system 100 according to the present embodiment, as well as a driving target object 10.

FIG. 1 shows an exemplary configuration of a driving system 100 according to the present embodiment, together with a driving target object 10. The driving system 100 is a system to drive the driving target object 10, and is an optical module as an example of the present embodiment. The driving target object 10 includes a lens. As alternative or in addition to this, the driving target object 10 may be an optical component such as prisms, mirrors, and gratings. The driving system 100 drives the driving target object 10 and controls its position. In the present embodiment, an example where the driving target object 10 is a lens will be described. That is, an example will be described where the driving system 100 of the present embodiment controls a position of a lens and performs an auto-focus function, a vibration reduction function, and the like. The driving system 100 includes a sensor 20, a driving control apparatus 30, and a driving device 40.

The sensor 20 detects a position of the driving target object 10. The sensor 20 may detect a position in one direction of the driving target object 10. Also, the sensor 20 may detect positions in each of plurality directions of the driving target object 10. The sensor 20 detects the position of the driving target object 10 by sensing magnetic field, reflection light, eddy current, electrostatic capacity, and ultrasonic wave etc., for example, which changes depending on the position of the driving target object 10. As an example, when the driving target object 10 has a magnet etc., the sensor 20 may be a magnetic sensor to detect a magnetic field of the magnet. The sensor 20 may have a hall element, a GMR (Giant Magneto Resistive) element, an inductance sensor etc. The sensor 20 supplies a detection signal of the position of the driving target object 10 to the driving control apparatus 30.

The detection signal may be input as an analog signal from the sensor 20 to the driving control apparatus 30. In this case, the analog signal may be amplified by an amplifier and be input to the driving control apparatus 30. Also, the driving control apparatus 30 may include an amplifier therein to amplify the analog signal received from the sensor 20.

The detection signal may be input as a digital signal to the driving control apparatus 30. In this case, the analog signal from the sensor 20 may be converted into a digital signal by an A/D converter to be input to the driving control apparatus 30. Also, the driving control apparatus 30 may include an A/D converter therein to convert the analog signal received from the sensor 20 into a digital signal.

The driving control apparatus 30 drives the driving device 40 according to a detection signal of the sensor 20. When the driving target object 10 is a lens, the driving control apparatus 30 may drive the driving device 40 so as to perform focus control of the lens or vibration reduction control. The driving control apparatus 30 may receive, from outside, an input signal indicating a target position in the focus control or the vibration reduction control, and may move the driving target object 10 to the target position. The driving control apparatus 30 supplies, to the driving device 40, a driving signal to control driving the driving device 40. The driving control apparatus 30 supplies, to the driving device 40, a driving signal based on PID (Proportional Integral Differential) control, for example.

The driving device 40 drives the driving target object 10 according to the driving signal from the driving control apparatus 30. The driving device 40 may have an actuator. In this case, the driving device 40 may move the driving target object 10 by a magnetic force. For example, the driving device 40 may include a coil and have an electromagnet to generate a magnetic force by energizing the coil. The driving device 40 may generate a magnetic force so as to pull or push the magnet provided in the driving target object 10 to move the driving target object 10.

The driving device 40 moves, as an example, the driving target object 10 in one direction (for example, in X direction). Also, the driving device 40 may have a plurality of actuators and move the driving target object 10 in a plurality of different directions. The driving device 40 may move the driving target object 10, for example, in two different directions (e.g. in X and Y direction), or in three different directions (e.g. in X, Y and Z direction).

The driving system 100 according to the present embodiment described above can feedback the detection result of a position of the sensor 20 to accurately control the position of the driving target object 10. However, even using such driving system 100, when characteristics of the driving device 40 changes, its stable operation becomes hard to maintain, resulting in that the operation of the system may oscillate or stop. For example, in the driving device 40, operating characteristics to the driving signal may change suddenly or unexpectedly due to wear of mechanical unit, assembly failures, partial destruction, falling, manufacturing defects of components, and aging etc.

Figure 2:
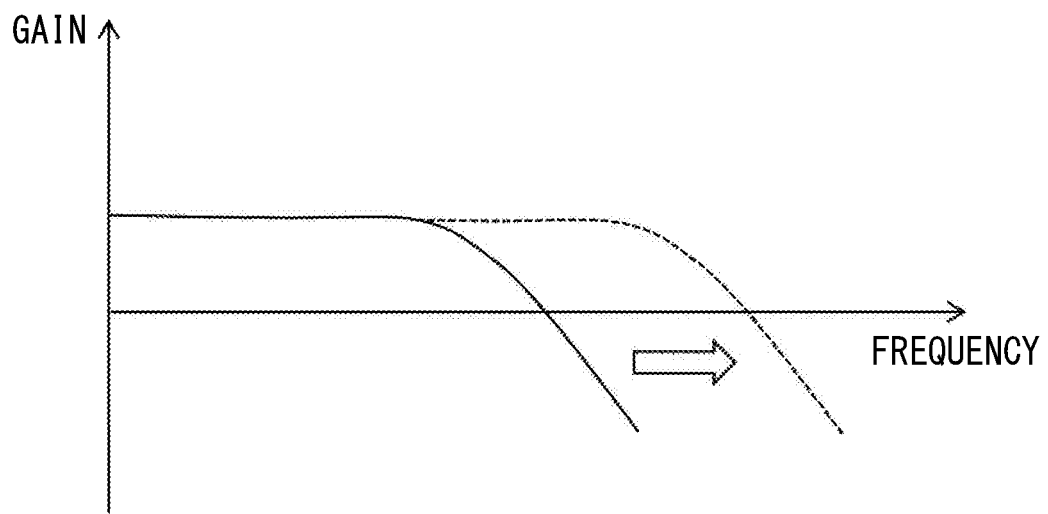
FIG. 2 shows a first example of change in operating characteristics of a driving device 40.

FIG. 2 shows a first example of change in operating characteristics of a driving device 40. In FIG. 2, the horizontal axis represents frequency and the vertical axis represents gain. FIG. 2 shows exemplary operating characteristics of the driving device 40 represented by a solid line. The frequency characteristics of the driving device 40 may change from the frequency characteristics represented by the solid line to a frequency characteristics represented by a dashed line. That is, in the driving device 40, a cut-off frequency of the frequency characteristics of the gain may be changed so as to shift to the high frequency side.

Figure 3:
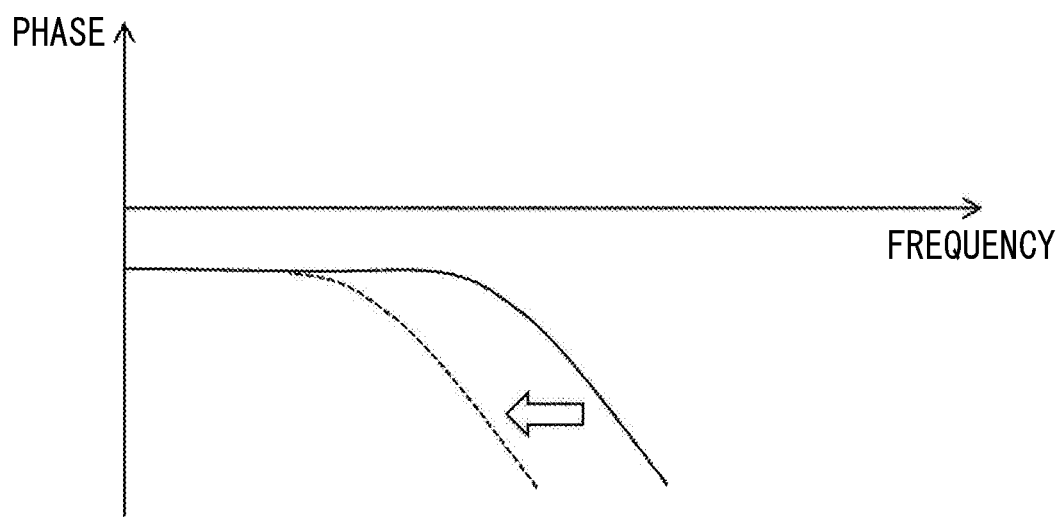
FIG. 3 shows a second example of change in operating characteristics of the driving device 40.

FIG. 3 shows a second example of change in operating characteristics of a driving device 40. In FIG. 3, the horizontal axis represents frequency and the vertical axis represents phase. FIG. 3 shows exemplary operating characteristics of the driving device 40 represented by a solid line. The phase characteristics of the driving device 40 may change from the phase characteristics represented by the solid line to a phase characteristics represented by a dashed line. That is, in the driving device 40, frequency characteristics of the phase may be changed so as to shift to the low frequency side.

When characteristics change as shown in FIG. 2 and FIG. 3 occur, a feedback system may become unstable and the driving signal may oscillate. In this case, when the driving device 40 can follow the driving signal, the driving target object 10 is made vibrated. Also, when the driving device 40 can not follow the driving signal, operation of the driving target object 10 is made stopped. Like this, the system goes out of control when the system oscillates or stops, therefore the driving system 100 can no longer take actions against occurrence of abnormalities in the driving device 40.

Thus, the driving system 100 according to the present embodiment prevents the system from becoming unstable, even when such sudden or unexpected characteristics change in the driving device 40 occurs. The driving system 100 includes a driving control apparatus 30 to operate to reduce the oscillation when the driving signal oscillates. Such driving system 100 will be described next.

Figure 4:
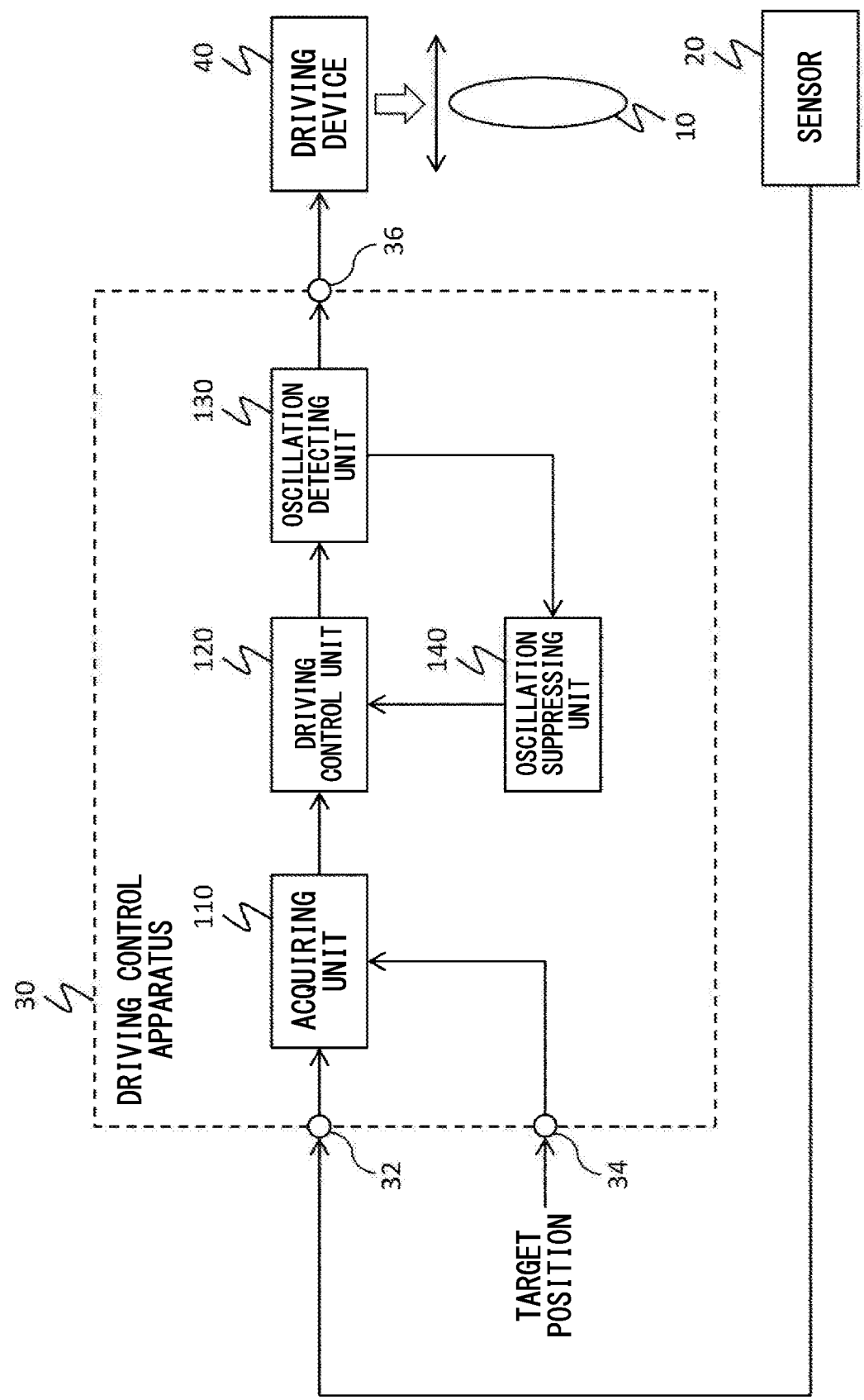
FIG. 4 shows an exemplary configuration of a driving control apparatus 30 included in the driving system 100 according to the present embodiment.

FIG. 4 shows an exemplary configuration of a driving control apparatus 30 included in the driving system 100 according to the present embodiment. In the driving system 100 according to the present embodiment, operations which are substantially the same as the operations of the driving system 100 shown in FIG. 1 are numbered the same, and the description will not be repeated. The driving control apparatus 30 includes a first input terminal 32, a second input terminal 34, an output terminal 36, an acquiring unit 110, a driving control unit 120, an oscillation detecting unit 130, and an oscillation suppressing unit 140.

The first input terminal 32 receives a detection signal of the sensor 20. The second input terminal 34 receives an input signal to indicate the target position supplied from outside. The output terminal 36 outputs a driving signal of the driving control apparatus 30.

The acquiring unit 110 acquires a detection signal according to a detection result of sensing the position of the driving target object 10. The acquiring unit 110 may receive, from the first input terminal 32, a detection signal supplied by the sensor 20. Also, the acquiring unit 110 may acquire information about the target position of the driving target object 10. The acquiring unit 110 may receive, from the second input terminal 34, an input signal to indicate a target position supplied from outside. The acquiring unit 110 supplies the acquired detection signal and the acquired input signal to the driving control unit 120.

The driving control unit 120 generates, based on the detection signal, a driving signal to move the driving target object 10 to the target position. The driving control unit 120 may acquire information about the target position of the driving target object 10. The driving control unit 120 generates a driving signal by PID control based on the detection signal, for example. The driving control unit 120 may generate a driving signal using predetermined PID control parameters. The driving control unit 120 outputs the generated driving signal from the output terminal 36 to the driving device 40. The driving control unit 120 may include an output driver which has an H-bridge circuit etc. to control driving directions and driving amount etc. of the driving target object 10.

The oscillation detecting unit 130 detects oscillation in a signal at a predetermined object point on the signal path from the detection signal to the driving signal. FIG. 4 shows an example where a signal line from the first input terminal 32 to the output terminal 36 is regarded as the signal path. Also, FIG. 4 shows an example where the object point is determined on a signal path between the driving control unit 120 and the output terminal 36. That is, FIG. 4 shows an example where the oscillation detecting unit 130 receives the driving signal output from the driving control unit 120 and detects oscillation in the driving signal. The oscillation detecting unit 130 may detect an oscillation frequency of the input signal. Also, the oscillation detecting unit 130 may detect a change in signal amplitude of the input signal.

The oscillation detecting unit 130 may output a signal at the object point to a succeeding stage in the signal path. In an example in FIG. 4, the oscillation detecting unit 130 outputs the received driving signal to the output terminal 36. Also, when the oscillation in the driving signal is detected, the oscillation detecting unit 130 supplies the detection result to the oscillation suppressing unit 140.

The oscillation suppressing unit 140, according to detection of the oscillation, suppresses the oscillation at the predetermined object point on the signal path. The oscillation suppressing unit, according to detection of the oscillation, may change at least one of the phase characteristics and the gain characteristics of the driving control unit 120. The oscillation suppressing unit 140 changes at least a part of control parameters such as the PID parameters of the driving control unit 120, for example. Also, the parameters may be changed intermittently, as well as time or the number of the oscillation etc. Also, in case the oscillation does not get improved, a method to change the characteristics may be changed.

Also, when the oscillation is detected, the oscillation suppressing unit 140 may cut off an electrical connection between the driving control unit 120 and the output terminal 36, and cut off the output of the output driver. Alternatively, the oscillation suppressing unit 140 may set an output of the driving control unit 120 as a substantially constant predetermined output. Thereby, the oscillation suppressing unit 140 may set a closed loop controlling the position of the driving target object 10 to cut-off state.

In this case, the oscillation suppressing unit 140 may continue the state where the closed loop is cut off for a substantially constant time. The oscillation suppressing unit 140 may continue being in the state to cut off the closed loop, for example, for a predetermined substantially constant time or for a period of time up to when it is judged that the vibration becomes smaller than or equal to a predetermined signal amplitude to end. Also, the continuing time may be specified by a user etc. Alternatively, the oscillation suppressing unit 140 may maintain the cut-off state of the closed loop. These selections may be settable from outside, or may be automatically determined depending on a predetermined condition.

The oscillation suppressing unit 140 may change the PID parameters so as to change the frequency characteristics of the gain of the driving control unit 120. The oscillation suppressing unit 140 reduces the cut-off frequency so as to compensate at least part of change in the frequency characteristics of the gain shown in FIG. 2, for example. Also, the oscillation suppressing unit 140 may change the PID parameters so as to change the phase of the driving control unit 120. The oscillation suppressing unit 140 changes the frequency characteristics of the phase so as to compensate at least part of change in the frequency characteristics of the phase shown in FIG. 3, for example.

Also, the oscillation suppressing unit 140 may reduce the gain of the driving control unit 120, according to detection of the oscillation. The oscillation suppressing unit 140 may reduce a gain of a predetermined band of the driving control unit 120, or, alternatively, may reduce a gain over the entire band thereof. Also, the oscillation suppressing unit 140 may increase (advance) the phase of the predetermined band of the driving control unit 120, or, alternatively, may increase a phase over the entire band thereof.

Note that the change in the operating characteristics of the driving device 40, although variations exist in individuals thereof, may have tendencies according to kinds, model numbers, manufacturing lots, manufacturing maker, manufacturer, and the like. Thus, tendencies etc. in changes in the operating characteristics of the driving device 40 may be accumulated to predetermine an adjusting amount of the driving control unit 120. The driving control unit 120 may change the control parameters of the driving control unit 120 depending on the predetermined adjusting amount. In this case, it is desirable to determine as a factor the adjusting amount of the driving control unit 120 depending on the change amount of the operating characteristics of the driving device 40. Thereby, the driving control unit 120 can change the control parameters of the driving control unit 120 depending on the change amount of the operating characteristics of the driving device 40.

Also, when the oscillation detecting unit 130 detects an oscillation frequency of the signal at the object point, the oscillation suppressing unit 140 may change at least one of the phase characteristics and the gain characteristics of the driving control unit 120 depending on the oscillation frequency. The oscillation suppressing unit 140 may reduce the gain at the oscillation frequency and, as alternative or in addition to this, may increase the phase characteristics at the oscillation frequency.

As described above, since the driving control apparatus 30 according to the present embodiment feedbacks to the control operation of the driving control unit 120 according to the driving signal having oscillated, the system can be prevented from becoming unstable or the frequency of instability can be reduced even when the driving device 40 suddenly or unexpectedly changes. Thereby, the operation of the system can be continued even when abnormalities occur in the driving device 40, and, for example, users, operators, developers and the like who are operating the system can determine whether continuing the system or not while checking the operation of the system.

Also, such sudden or unexpected change in the operating characteristics of the driving device 40 may be eliminated as time elapses, so that the operating characteristics of the driving device 40 may return to the original state. Thus, after suppressing the oscillation in the signal path, the oscillation suppressing unit 140 may determine, according to an instruction from the user, whether maintaining the change in at least one of the phase characteristics and the gain characteristics of the driving control unit 120, or returning it to the original state. Also, when oscillation is detected, the oscillation suppressing unit 140 adjusts a part of parameters and avoids the oscillation, then, during inputting of a target value, the parameters may be changed for the previous parameters, or predetermined parameters etc. Like this, the driving control apparatus 30 can prevent a situation where the system oscillates or stops and goes out of control, and maintain the stability of the system.

Figure 5:
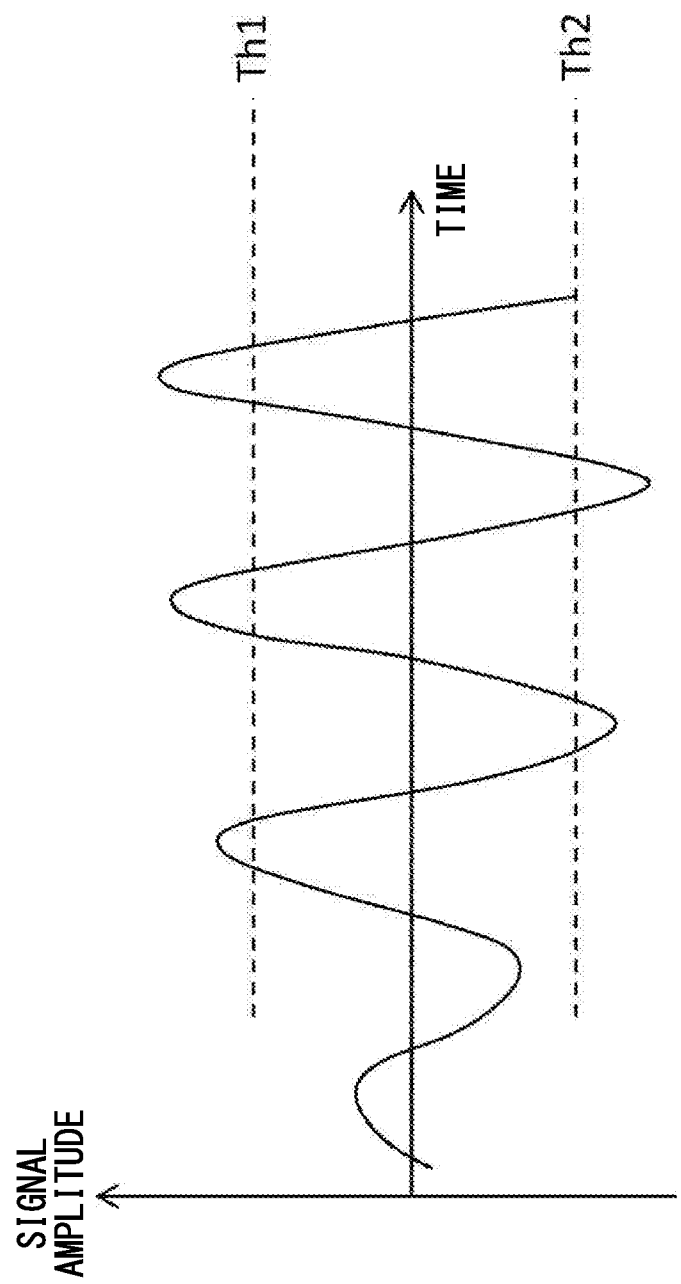
FIG. 5 shows an exemplary signal which is input to an oscillation detecting unit 130 according to the present embodiment.

FIG. 5 shows an exemplary signal which is input to an oscillation detecting unit 130 according to the present embodiment. The oscillation detecting unit 130 detects, according to that a signal at the object point as shown in FIG. 5 is input, whether the signal is oscillating or not. In FIG. 5, the horizontal axis represents time and the vertical axis represents signal amplitude.

The oscillation detecting unit 130 detects whether the signal is oscillating or not, for example, by comparing an amplitude value of an input signal and a predetermined threshold. FIG. 5 shows an example where the oscillation detecting unit 130 detects oscillation in a signal, using two different-valued thresholds. The oscillation detecting unit 130 may judge whether the signal is oscillating, according to that an amplitude value of a signal exceeds a first threshold Th 1, then becomes below the first threshold Th 1, then becomes below a second threshold Th 2, and then exceeds the second threshold Th 2. Also, the oscillation detecting unit 130 may judge whether the signal is oscillating, by detecting several times, a vibrating operation in signal amplitude which is detected with such two thresholds. In that case, the number of the detection times to judge whether the signal is oscillating may be settable.

The example in FIG. 5 has described an example where the oscillation detecting unit 130 uses two thresholds, but it is not limited to this. For example, the first threshold Th 1 and the second threshold Th 2 may be the same value, or zero. That is, the oscillation detecting unit 130 may judge whether a signal oscillates using one threshold, or, alternatively, may judge whether a signal oscillates using three or more thresholds.

Also, the oscillation detecting unit 130 may detect an oscillation frequency of the signal based on timing when a signal value of a signal at the object point crosses the threshold. The oscillation detecting unit 130, when detecting using two thresholds that signal amplitude vibrates, may detect a time interval where a signal value exceeds one threshold, as an oscillation cycle of the signal, for example.

Note that the oscillation detecting unit 130 has a pseudo-differential circuit, a high pass filter and a bandpass filter, and may reduce a DC component of an input signal. Also, the oscillation detecting unit 130 may add an off-set signal to an input signal. Also, the oscillation detecting unit 130 has a waveform shaping circuit etc. and may convert an input signal into a pulse train etc. In this case, the oscillation detecting unit 130 may have a frequency counter.

Figure 6:
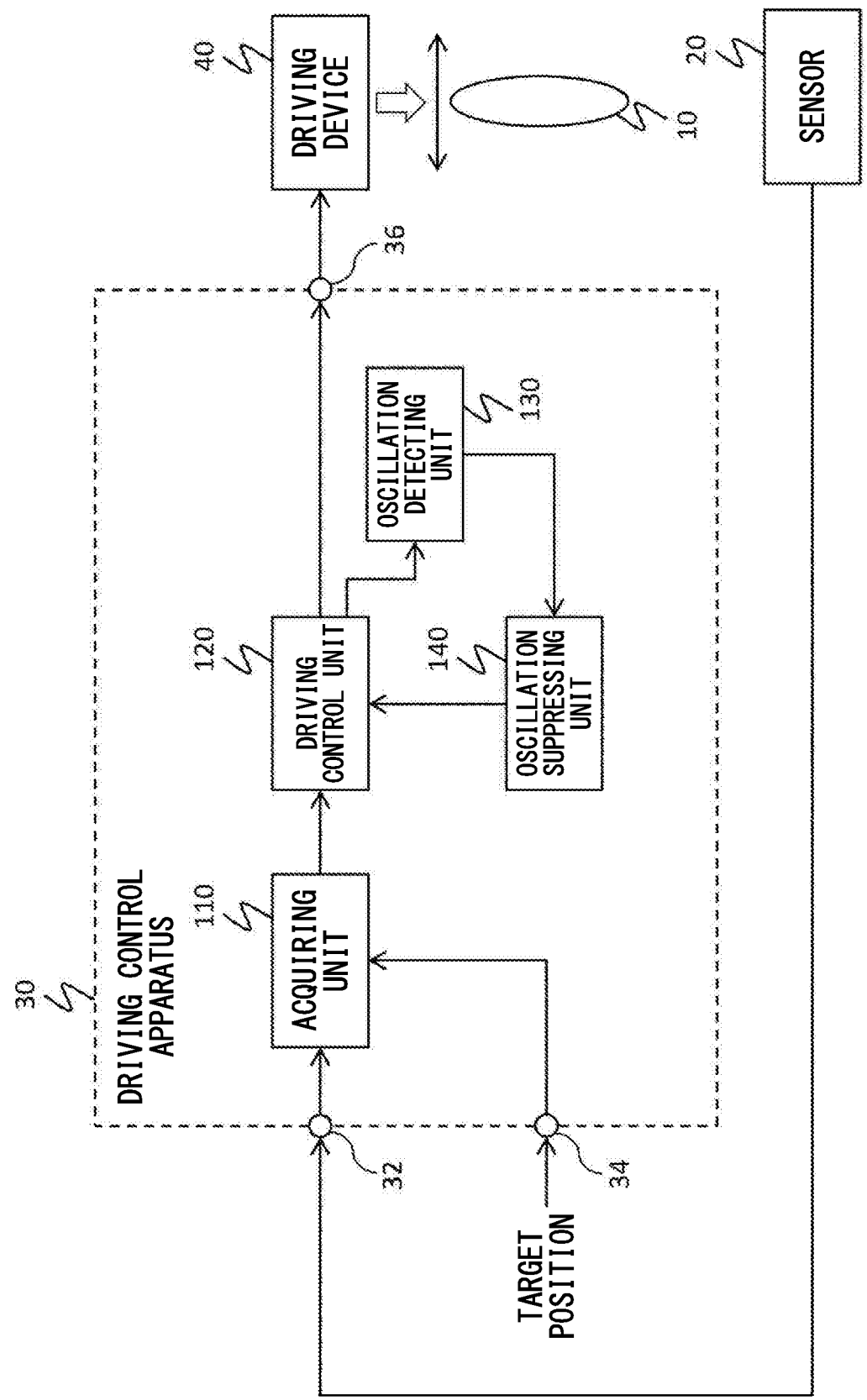
FIG. 6 shows a first modification example of the driving control apparatus 30 included in the driving system 100 according to the present embodiment.

FIG. 6 shows a first modification example of the driving control apparatus 30 included in the driving system 100 according to the present embodiment. In the driving system 100 according to the present embodiment, operations which are substantially the same as the operations of the driving system 100 shown in FIG. 4 are numbered the same, and the description will not be repeated. The driving control apparatus 30 in the first modification example shows an example where the oscillation detecting unit 130 is connected to an inner circuit of the driving control unit 120.

That is, the oscillation detecting unit 130 detects oscillation in at least one of a proportional component, an integral component, and a differential component which are used to generate a driving signal by PID control. When the system oscillates, individual control signal in PID control vibrates. Thus, since abnormalities of the control signal can be immediately detected by the oscillation detecting unit 130 detecting at least a part of the control signal of the driving control unit 120, the oscillation suppressing unit 140 can promptly change the control parameters.

Figure 7:
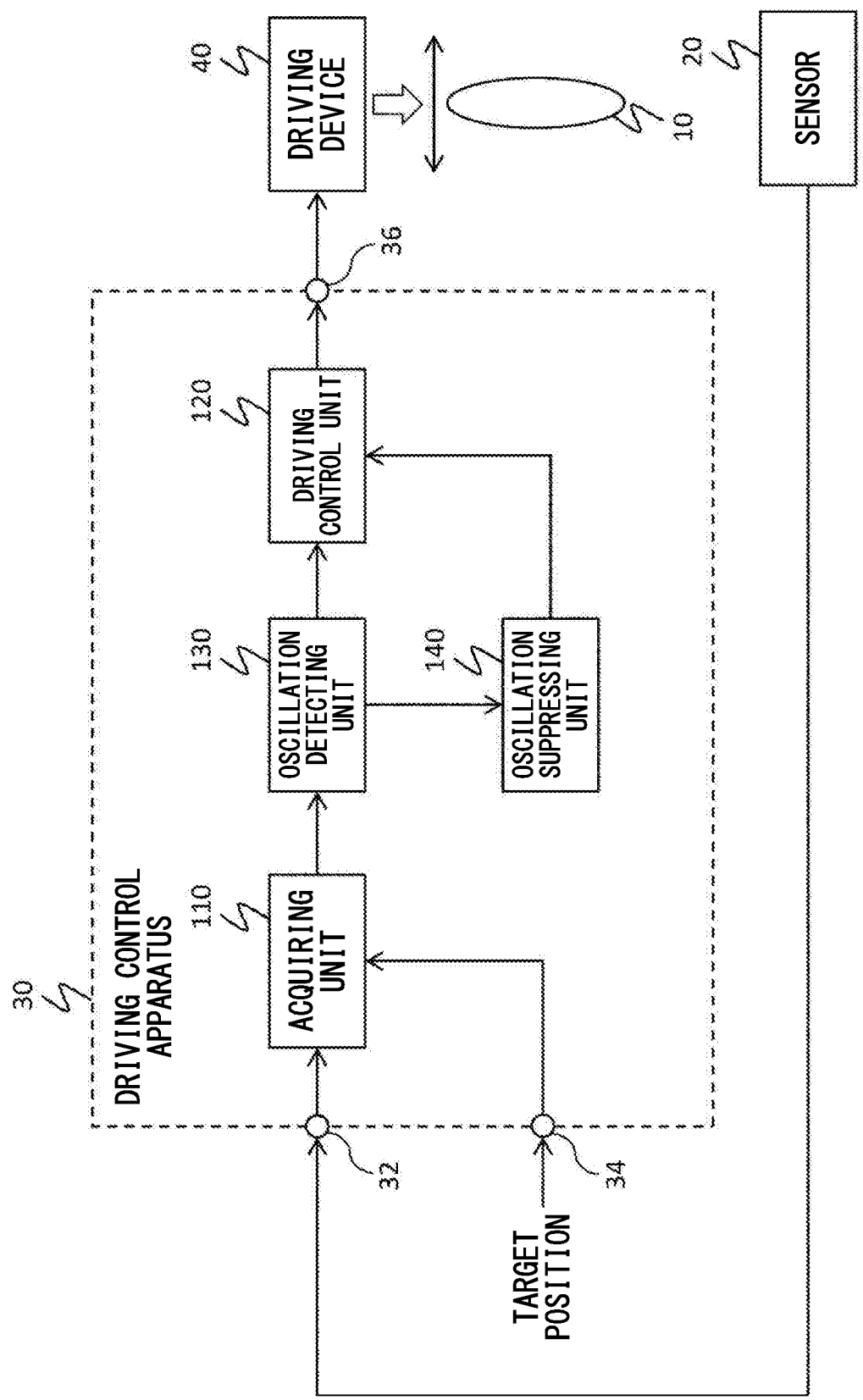
FIG. 7 shows a second modification example of the driving control apparatus 30 included in the driving system 100 according to the present embodiment.

FIG. 7 shows a second modification example of the driving control apparatus 30 included in the driving system 100 according to the present embodiment. In the driving system 100 according to the present embodiment, operations which are substantially the same as the operations of the driving system 100 shown in FIG. 4 are numbered the same, and the description will not be repeated. The driving control apparatus 30 in the second modification example shows an example where a detection signal of the sensor 20 is input to the oscillation detecting unit 130.

A signal path between the sensor 20 and the driving control unit 120 transmits a feedback signal, therefore its wiring length is longer and its arrangement is freer than those of a signal path which transmits a driving signal between the driving control unit 120 and the driving device 40. Thus, providing the oscillation detecting unit 130 between the sensor 20 and the driving control unit 120 can enhance the freedom of arrangement of the oscillation detecting unit 130. Also, even in a state where the driving system 100 has been already assembled, for example, the oscillation detecting unit 130 can be provided between the sensor 20 and the driving control unit 120.

As described above, the oscillation detecting unit 130 according to the present embodiment has to be able to detect an oscillation state of the system, and may detect oscillation in at least one of a detection signal of the sensor 20 on the signal path, a driving signal of the driving control unit 120, and a signal to generate the driving signal. Also, the oscillation detecting unit 130 may detect a physical vibrating operation of the driving target object 10.

It has been described that the oscillation suppressing unit 140 according to the present embodiment described above adjusts a driving condition of the driving control unit 120. As alternative or in addition to this, the oscillation suppressing unit 140 may insert a filter on a predetermined position on a signal path from the detection signal up to the driving signal. For example, the oscillation suppressing unit 140 may include a switching switch and a filter, provide on the signal path a switching path to switch whether to allow a signal to pass the filter or not, send a switching signal to the to the switching switch, and control inserting the filter. In this case, the filter may be a low pass filter, a notch filter, a band-stop filter, and the like.

It has been described that the driving control apparatus 30 according to the present embodiment described above suppresses the oscillating operation of the system, according to detect the oscillation state of the system. In addition to this, the driving control apparatus 30 may stop the operation of the system when the oscillating operation of the system can not be enough suppressed, despite attempt to do so. That is, the driving control apparatus 30 stops driving the driving device 40 when it is judged that operating characteristics of the driving device 40 changes such that it goes beyond a control range of the driving control unit 120.

For example, when the position of the driving target object 10 is controlled by an open loop control, the driving control apparatus 30 may stop outputting of the driving signal. Also, when the position of the driving target object 10 is controlled by a closed loop control, the driving control apparatus 30 may stop power supply to the driving device 40. Thereby, the driving control apparatus 30 can suppress the oscillating operation and secure safety of the system.

It has been described that the driving control apparatus 30 according to the present embodiment described above suppresses the oscillating operation of the system by adjusting the driving conditions of the driving control unit 120. In this case, the driving control apparatus 30 may adjust driving conditions, prioritizing suppressing the oscillation. Then, the driving control apparatus 30 may, after suppressing the oscillation, perform auto-tuning etc. to finely adjust the driving conditions for more appropriate driving conditions. The driving control apparatus 30 according to the present embodiment described above can adjust the driving conditions for appropriate driving conditions while continuing the operation of the system, corresponding to the sudden change in the operating characteristics of the driving device 40.

Figure 8:
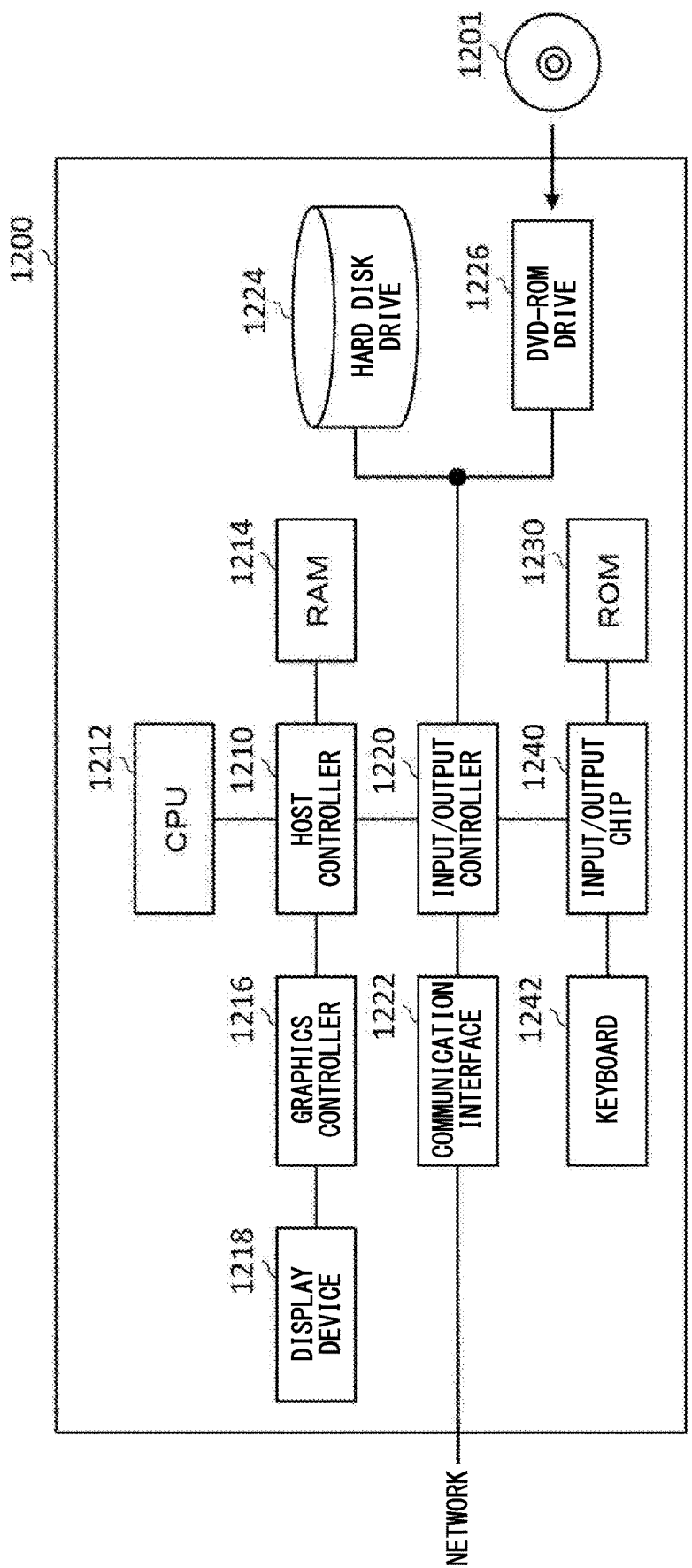
FIG. 8 shows an example of a computer 1200 which can realize a plurality of aspects of the present invention entirely or partially.

FIG. 8 shows an example of a computer 1200 which can realize a plurality of the present invention entirely or partially. A program installed in the computer 1200 can make the computer 1200 function as an operation which is associated with the apparatus according to the embodiment of the present invention, or one or more "section(s)" of the apparatus, or can make the computer 1200 perform the operation or the one or more "section(s)", and/or can make the computer 1200 perform processes according to the embodiment of the present invention or steps of the processes. Such programs may be executed by a CPU 1212 so that the computer 1200 performs particular operations associated with some or all of blocks in the flowchart and the block diagrams according to the present specification.

The computer 1200 according to the present embodiment includes a CPU 1212, a RAM 1214, a graphics controller 1216, and a display device 1218, and these are connected to each other by a host controller 1210. The computer 1200 also includes input/output units such as a communication interface 1222, a hard disk drive 1224, a DVD-ROM drive 1226, and an IC card drive, and these are connected to the host controller 1210 via an input/output controller 1220. The computer also includes legacy input/output units such as a ROM 1230 and a keyboard 1242, these are connected to the input/output controller 1220 via an input/output chip 1240.

The CPU 1212 operates according to programs stored in the ROM 1230 and the RAM 1214, and thereby controls each unit. The graphics controller 1216 acquires image data generated by the CPU 1212 on a frame buffer or the like provided in the RAM 1214 or in the graphics controller 1216 itself, and makes the image data to be displayed on the display device 1218.

The communication interface 1222 communicates with other electronic device via network. The hard disk drive 1224 stores programs and data used by the CPU 1212 within the computer 1200. The DVD-ROM drive 1226 reads programs or data from the DVD-ROM 1201, and provides the programs or the data to the hard disk drive 1224 via the RAM 1214. The IC card drive reads programs and data from the IC card, and/or writes programs and data into the IC card.

The ROM 1230 stores therein a boot program etc. executed by the computer 1200 at the time of activation, and/or a program that depend on the hardware of the computer 1200. The input/output chip 1240 may also connect various input/output units to the input/output controller 1220 via a parallel port, a serial port, a keyboard port, a mouse port etc.

A program is provided by a computer readable storage medium such as the DVD-ROM 1201 or the IC card. The program is read out from the computer readable storage medium, installed into the hard disk drive 1224, RAM 1214 or ROM 1230, which are also examples of computer readable storage medium, and executed by the CPU 1212. The information processing described in these programs is read out by the computer 1200, resulting in cooperation between a program and the above-described various types of hardware resources. An apparatus or method may be constituted by realizing the operation or processing of information, according to the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording mediums such as the RAM 1214, the hard disk drive 1224, the DVD-ROM 1201 or the IC card, transmits the read-out transmission data to a network, or writes reception data received from a network to a received buffer region etc. provided on the recording medium.

Also, the CPU 1212 may make all or necessary portion of a file or a database stored in an external recording medium such as the hard disk drive 1224, the DVD-ROM drive 1226 (DVD-ROM 1201), the IC card, etc. read out by the RAM 1214, and may perform various types of processing to the data on the RAM 1214. The CPU 1212 may then write back the processed data to the external recording medium.

Various types of information, such as various types of programs, data, tables, and databases may be stored in the recording medium for information processing. The CPU 1212 may perform, on the read-out data from the RAM 1214, various types of processing which includes various types of operations, information processing; conditional judging, conditional branch, unconditional branch, information search/replace etc., as described throughout the present disclosure and designated by an instruction sequence of the program, and write backs the result to the RAM 1214. Also, the CPU 1212 may search for information in a file, a database etc. in the recording medium. For example, when a plurality of entries, each of them having an attribute value of a first attribute associated with an attribute value of a second attribute are stored in the recording medium, the CPU 1212 may search for, from among the plurality of entries, an entry where the attribute value of the first attribute matches a designated condition, may read the attribute value of the second attribute stored in the entry, and thereby may acquire the attribute value of the second attribute associated with the first attribute that satisfies a predetermined condition.

The program or software modules in the above description may be stored in the computer readable storage media on or near the computer 1200. Also, a recording medium such as a hard disk or a RAM provided in a server system connected to a dedicated communication network or the Internet can be used as the computer readable storage media, and thereby provide the programs to the computer 1200 via network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A driving control apparatus comprising:
   an acquiring unit to acquire a detection signal depending on a position of a lens of an optical module;
   a driving control unit to generate a driving signal to move the lens to a target position in a focus control or a vibration reduction control based on the detection signal;
   an output terminal through which the driving signal generated by the driving control unit is output;
   an oscillation detecting unit to detect, at an object point on a signal path of the driving signal between the driving control unit and the output terminal, whether the driving signal is oscillating or not; and
   an oscillation suppressing unit to suppress oscillation in the driving signal at the object point on the signal path in response to detecting that the driving signal is oscillating.

2. The driving control apparatus according to claim 1, wherein the oscillation suppressing unit changes, in response to detecting that the driving signal is oscillating, at least one of phase characteristics and gain characteristics of the driving control unit.

3. The driving control apparatus according to claim 2, wherein
   the oscillation detecting unit detects an oscillation frequency of the driving signal at the object point, and
   the oscillation suppressing unit changes the at least one of the phase characteristics and the gain characteristics of the driving control unit depending on the oscillation frequency.

4. The driving control apparatus according to claim 3, wherein the oscillation detecting unit detects the oscillation frequency based on timing when a signal value of the driving signal at the object point crosses a threshold.

5. The driving control apparatus according to claim 2, wherein the oscillation suppressing unit reduces gain of the driving control unit in response to detecting that the driving signal is oscillating.

6. The driving control apparatus according to claim 2, wherein the oscillation suppressing unit, after suppressing the oscillation in the signal path, determines, according to an instruction from a user or automatically based on a setting, whether maintaining change in the at least one of the phase characteristics and the gain characteristics of the driving control unit, or returning the at least one of the phase characteristics and the gain characteristics of the driving control unit back to original phase characteristics and gain characteristics.

7. The driving control apparatus according to claim 1, wherein the detection signal is an analog signal.

8. The driving control apparatus according to claim 1, wherein the detection signal is a digital signal.

9. The driving control apparatus according to claim 1, wherein the driving control unit has an output driver to control driving amount of the lens.

10. The driving control apparatus according to claim 9, wherein the output driver has an H-bridge circuit.

11. A device comprising:
    a sensor to detect the position of the lens; and
    the driving control apparatus according to claim 1.

12. The device according to claim 11, wherein
    the lens has a magnet; and
    the sensor is a magnetic sensor.

13. The device according to claim 12, wherein the magnetic sensor is a hall element.

14. An optical module comprising:
    the device according to claim 11;
    the lens; and
    a driving device to drive the lens according to the driving signal from the driving control apparatus.

15. A driving control method comprising:
    acquiring a detection signal depending on a position of a lens of an optical module;
    generating, by a driving control unit, a driving signal to move the lens to a target position in a focus control or a vibration reduction control based on the detection signal;
    outputting, from an output terminal, the driving signal generated by the driving control unit;
    detecting, at an object point on a signal path of the driving signal between the driving control unit and the output terminal, whether the driving signal is oscillating or not; and
    suppressing oscillation in the driving signal at the object point on the signal path in response to detecting that the driving signal is oscillating.

* * * * *